Jan. 17, 1956  L. A. OBLOY  2,730,917
LATHE CENTER
Filed April 28, 1954
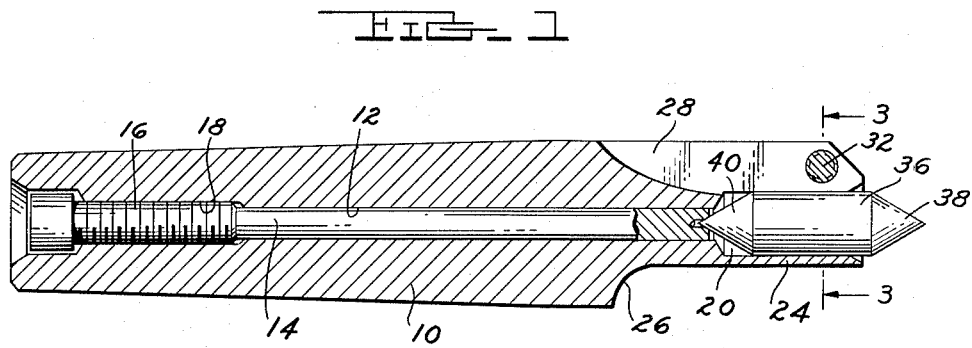
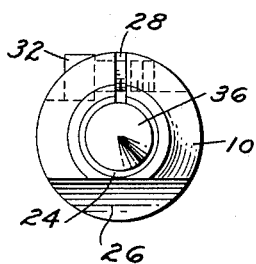
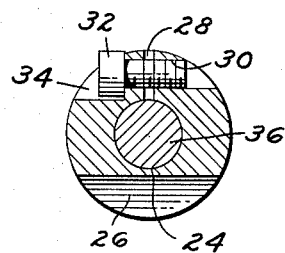
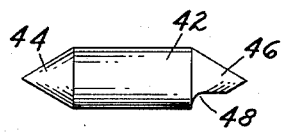
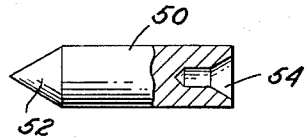
INVENTOR.
LEO A. OBLOY
BY
Barnes, Kisselle, Laughlin & Raisch
ATTORNEYS United States Patent Office 2,730,917
Patented Jan. 17, 1956

2,730,917
LATHE CENTER
Leo A. Obloy, Detroit, Mich.

Application April 28, 1954, Serial No. 426,063

2 Claims. (Cl. 82—33)

This invention relates to a lathe center and is especially concerned with a lathe center having a replaceable point which is adjustable, removable and reversible.

Lathe centers with adjustable points are known, and it is also known to include in a lathe center a point which is formed of hard material such as tungsten, carbide or stellite.

It is an object of the present invention to provide a lathe tail stock insert which is designed to receive a replaceable center of the type having a conical end or a conical recess and to provide a holder for such unit which is especially adapted to clamp said center and to position said center in a predetermined location.

A further object is the provision of a tail stock center which is designed to permit close operation of a lathe tool or grinding wheel and which has a design especially adapted to a clamping construction for a replaceable center of tungsten, carbide or the like.

A further object is the provision of an adjustment which utilizes a push rod and back-up screw and a lock for the various elements which is not subject to loosening by the machine vibration.

Other objects and features of the invention which relate to the details of the construction in operation will be apparent in the following description and claims.

Drawings accompany the specification, and the various views thereof may be briefly described as:

Figure 1, a longitudinal sectional view showing the lathe centers and parts.

Figure 2, a view of the insert end of the center.

Figure 3, a sectional view on line 3—3 of Figure 1.

Figure 4, a view of a lathe center which can be used in the device.

Figure 5, a view of a lathe center having pointed and recessed ends for use in the device.

Referring to the drawings, the body of the center is shown at 10 having a standard Morse taper for insertion in a standard machine. The body is provided with a central bore 12 for receiving a locator pin 14. To the rear of the pin 14 is an adjustment screw 16 in a tapped recess 18.

At the forward end of the center a central enlarged recess 20 of cylindrical shape is provided opening to the front of the center and connecting to the central bore 12. On one side of the recess 20 the body 10 is cut away to leave a relatively thin wall 24. The recess formed by the cut-away terminates in a curved shoulder 26. On the other side of the bore 20 is formed a slot 28 extending from the fore end of the lathe center back to a point well past the recess 20.

The center is tapped at 30 at right angles to the slot 28, and the bolt 32 has a head recessed into the wall of the center at 34. The bolt 32 is received in a tapped hole on the other side of the slot 28 and will serve when tightened to draw the portions of the center on either side of the slot together to clamp a center insert 36 in the recess 20.

The body 10 can be formed of ordinary steel, such as has been used for the manufacture of these centers in the past. The insert 36 is preferably formed of a tungsten carbide material which is extremely hard and wear resistant. The insert 36 has tapered ends 38 and 40, one of which is received in a recess in the end of a locator pin 14.

In Figure 4 a substitute insert is shown at 42 having a conical end 44 and an end 46 which has been formed at 48 to permit extremely close work on small parts adjacent the center.

In Figure 5 an insert 50 is shown having a conical end 52 and also a recessed end 54.

It will be seen that by releasing the clamp screw 32 the inserts may be substituted for each other or reversed, depending on which end is to be used. In the event one end is chipped or broken another end may be readily available for use without a re-grinding operation.

It is important that the insert be tightly clamped in the tool and also that it may be moved forward as the inserts are re-ground and used up. The locator pin and the adjustment screw 16 permit a solid back-up of the insert. The clamping screw 32 can be tightened to get a solid vibration-proof clamp on the insert due to the thinness of wall 24 which gives the body considerable flexibility at this point for clamping without reducing its overall rigidity.

It will thus be seen that I have provided a lathe center which is extremely flexible in operation and with all the advantages of a solid stock unit and all the advantages of a readily exchangeable unit, thus reducing down time on a machine if breakage occurs and resulting in considerable saving in ultimate cost of operation.

I claim:

1. A tail stock center having a solid tapered body having a central bore enlarged at one end to receive an insert and tapped at the other end to receive an adjustment screw, a locator pin in said bore centrally of said body projectable into said enlarged bore at said one end of said body, said pin having a recess adjacent said last-named bore, an insert in said last-named bore of a relatively hard material, such as tungsten carbide, having one end receivable in the recess of said locator pin and the other end projectable from said body to serve as a tail stock center, said body being shaped at the forward end to have a side recess with a chordal base extending from said one end of said body to a point well back of said enlarged bore, the base of said recess being relatively close to said bore to provide an extremely thin wall between said recess and said bore, said body on the other side of said bore being axially slotted to a degree that said slot intersects said insert bore, and means for clamping together the portions of said body on opposite sides of said slot to lock an insert in said enlarged bore.

2. A tail stock center having a solid tapered body provided with a central bore enlarged at one end to receive an insert and tapped at the other end to receive an adjustment screw, a locator pin in said bore centrally of said body projectable into said enlarged bore and said one end of said body, said pin extending slidably from the tapped portion of said bore to the enlarged portion, an insert in said last-named bore of a relatively hard material, such as tungsten carbide, having one end in engagement with said locator pin and the other end projectable from said body to serve as a tail stock center, said body being shaped at the forward end to have a side recess with a chordal base extending from said one end of said body to a point well back of said enlarged bore, the base of said recess being relatively close to said bore to provide an extremely thin wall between said recess and said bore, said body on the other side of said bore being axially slotted to a degree that said slot intersects said insert bore, and means for clamping together the portions of said body on opposite sides of said slot to lock an insert in said enlarged bore.

References Cited in the file of this patent
UNITED STATES PATENTS

| 686,534 | Rearwin | Nov. 12, 1901 |
| 1,317,894 | Robinson | Oct. 7, 1919 |
| 1,681,087 | Becker | Aug. 14, 1928 |
| 2,342,054 | Koenig | Feb. 15, 1944 |